United States Patent [19]

Beelen

[11] Patent Number: 5,560,582
[45] Date of Patent: Oct. 1, 1996

[54] FOLDABLE STAND FOR THREADING MACHINE

[75] Inventor: Valere H. J. Beelen, St. Trond, Belgium

[73] Assignee: Emerson Electric Company, St. Louis, Mo.

[21] Appl. No.: 204,785

[22] Filed: Mar. 2, 1994

[51] Int. Cl.$^6$ .................................................. F16M 13/00
[52] U.S. Cl. ...................... 248/588; 248/439; 248/631; 248/647; 248/676
[58] Field of Search .................................. 248/588, 647, 248/676, 631, 648, 129, 164, 176, 439; 280/47.17, 47.18, 47.34

[56] References Cited

U.S. PATENT DOCUMENTS

| | | | |
|---|---|---|---|
| 2,727,564 | 12/1955 | Gruber | 248/164 X |
| 2,992,833 | 7/1961 | Hoedinghaus et al. | 248/164 X |
| 3,223,468 | 12/1965 | Fenne | 248/164 X |
| 4,156,523 | 5/1979 | Bauer. | |
| 4,240,619 | 12/1980 | Wirges et al. | |
| 4,558,648 | 12/1985 | Franklin et al. | 248/588 X |
| 4,611,823 | 10/1986 | Haas. | |
| 4,645,169 | 2/1987 | Mischer | 248/631 X |
| 5,087,013 | 2/1992 | Gress et al. | |

FOREIGN PATENT DOCUMENTS

2051690  1/1981  United Kingdom.

Primary Examiner—Ramon O. Ramirez
Assistant Examiner—Derek J. Berger
Attorney, Agent, or Firm—Vickers, Daniels & Young

[57] ABSTRACT

A foldable wheeled stand is provided for supporting a motor driven pipe threading machine during operation thereof and for transporting the machine from one location to another. The stand includes a scissors-type leg assembly having lower ends which engage an underlying surface when the stand is both folded and unfolded and having upper ends which are respectively elevated and lowered relative to the support surface when the stand is in its unfolded and folded positions. A pipe threading machine is mounted between the upper ends of the stand for pivotal displacement about one of the upper ends and for sliding displacement relative to the other during the displacement of the stand and machine between the folded and unfolded positions of the stand. A bracket arrangement secures the threading machine to the stand in each of the folded and unfolded positions thereof, and a pair of gas springs are interposed between legs of the stand to counterbalance the weight of the threading machine during displacement of the stand between the folded and unfolded positions thereof.

31 Claims, 3 Drawing Sheets

FOLDABLE STAND FOR THREADING MACHINE

BACKGROUND OF THE INVENTION

This invention relates to the art of stands for metal working machines and, more particularly, to a foldable stand for a power driven threading machine.

The use of portable power driven pipe and rod threading machines to facilitate the on site preparation of threaded pipe and rod is of course well known, and it is likewise well known to provide a stand to support such a machine during metal working operations. Certain such stands for the latter purpose have been foldable and comprised of a scissors-like leg assembly having ground engaging wheel and handle components and which stands are adapted to be displaced between the folded and unfolded positions with the metal working machine mounted thereon. Such folding and unfolding has been achieved heretofore, for example, by a mechanical spring loaded counterbalance arrangement, or through the use of a crank actuated screw arrangement. When folded, the wheels and handle facilitate elevating one end of the stand and machine relative to the underlying support surface such that the stand and machine are supported by the wheels for movement from one location to another. When unfolded, the wheels and handle engage the underlying surface to support the threading machine in an elevated use position. Stands of this character are disclosed, for example, in U.S. Pat. Nos. 4,611,823 to Haas and 5,087,013 to Gress et al.

While wheeled stands of the foregoing character adequately serve their intended purpose with respect to supporting a threading machine in an elevated use position and facilitating the transportation of the machine from one location to another when the stand is in the folded position, there are a number of disadvantages with respect to the spring and screw arrangements by which the stand and the machine mounted thereon are displaced between the folded and unfolded positions of the stand. In this respect, the threading machine is quite heavy and may for example weigh 100 to 200 pounds. Therefore, in a counterbalancing spring arrangement such as that disclosed in the aforementioned patent to Haas, the spring force required to facilitate displacement of the stand and machine between the folded and unfolded positions of the stand is such that the latter operations are hazardous to a workman and can lead to injury. In particular in this resect, the spring is tensioned when the stand is in the folded position and, even though this tension is opposed by the weight of the machine during displacement of the stand to the unfolded position, the displacing force is not uniform and it is difficult for the workman to control unfolding of the stand so as to preclude sudden upward extension of the stand in response to contraction of the spring. An especially hazardous condition exists if the workman forgets to or inadequately latches the stand in the folded position and then attempts to remove the threading machine from the stand. This can result in uncontrolled accelerated displacement of the stand to the unfolded position subjecting the workman to serious injury. Still further, the counterbalance spring is contracted when the stand is in its unfolded position and, even though the weight of the machine is applied to the stand so as to apply an extending force on the spring, considerable physical effort is required on the part of a workman to initially displace the stand from the unfolded toward the folded position thereof.

In conjunction with screw operated displacement of a threading machine stand between the folded and unfolded positions thereof, it takes an undesirably long period of time to achieve such displacements and, when the stand is in or near the folded position, the workman has to either bend over or kneel in order to operate the screw mechanism. Such bending over or kneeling together with the time and effort required to operate the screw mechanism can be both physically uncomfortable and tiring for the workman. Still further, the screw mechanism for folding and unfolding the stand is structurally complex and expensive and, due to the weight of the threading machine, considerable wearing force is imposed between the component parts of the screw mechanism, thus increasing maintenance costs in connection with the stand.

A further disadvantage with regard to such stands heretofore available is that they are somewhat structurally complex requiring a support structure for the threading machine in addition to the scissors-like leg assembly by which Such support structure and machine are elevated and lowered as the stand is displaced between the folded and unfolded positions. Such structural complexity adds to the cost of construction as well as the cost of maintenance of the stand.

SUMMARY OF THE INVENTION

In accordance with the present invention, an improved portable stand is provided for power driven threading machines which minimizes and/or overcomes the foregoing disadvantages of such stands heretofore available while, at the same time, maintaining the advantage of portability with respect to transporting the stand and a machine thereon from one location to another. More particularly in accordance with present invention, the stand is comprised of a scissors-like support assembly displaceable between folded and unfolded positions, with the threading machine mounted thereon, and the support assembly is provided with a self contained fluid operated counterbalance arrangement for assisting displacement of the stand between the folded and unfolded positions thereof. Preferably, the counterbalance arrangement is comprised of a pair of gas springs of the type used, for example, to assist in the opening and closing of an automobile trunk lid. Such fluid operated counterbalance devices advantageously provide for elevating and/or lowering a load with the application of a generally uniform force on the load, whereby the displacement of the foldable stand and threading machine thereon between the folded and unfolded positions is achieved with minimum physical effort on the part of the workman. Importantly too, such displacements are achieved without subjecting the workman to potential injury from sudden upward extension of the stand during displacement thereof to the unfolded position or, when folded, such sudden upward extension as the result of removing the threading machine from the stand.

In accordance with another aspect of the invention, the threading machine is mounted on the stand through bracket arrangements on the support assembly, thus eliminating a separate threading machine support structure associated with the stand, minimizing the component parts of the stand, and promoting economy thereof. More particularly, one end of the machine is pivotally attached to one member of the support assembly by a first bracket, and the other end of the machine is slidable relative to another member of the support assembly through a second bracket which is selectively interconnectable, preferably through the use of pins, with the latter member in two positions corresponding to the folded and unfolded positions of the stand. Thus, manipulation of the stand between one of the folded and unfolded positions and the other is easily and quickly achieved by removing the pins from the second bracket and support member, elevating or lowering the stand to the other position, and reinserting the pins to engage the machine and stand in the other position.

The arrangement for mounting the threading machine on the stand together with the use of self contained fluid operated counterbalance devices structurally simplifies the stand, reduces the weight thereof, promotes economy with respect to the construction thereof, and promotes efficiency with respect to the manipulation of the stand and the machine thereon between the folded and unfolded positions.

It is accordingly an outstanding object of the present invention to provide an improved foldable stand to facilitate the support and portability of a power driven threading machine.

Another object is the provision of a foldable stand of the foregoing character which, with the machine mounted thereon, is easier to manually manipulate between the folded and unfolded positions thereof than stands heretofore provided.

Yet another object is the provision of a foldable stand of the foregoing character having an improved counterbalance arrangement which optimizes the ease with which the stand can be manipulated between the folded and unfolded positions thereof and which provides improved safety for a workman in connection with such manipulation.

Still a further object is the provision of a folding stand of the foregoing character wherein the threading machine is associated with the stand through mounting brackets which promote structural simplicity with respect to the stand and economy with respect to the construction thereof.

Yet another object is the provision of a foldable stand of the foregoing character wherein the counterbalance arrangement includes a self contained fluid operated counterbalance device or devices which provide improved control and safety with respect to manually displacing the stand and machine mounted thereon between the folded and unfolded positions of the stand.

Yet a further object is the provision of a foldable stand of the foregoing character which optimizes the time and physical effort required on the part of an operator or workman in connection with performing folding and unfolding functions with respect to the stand and machine mounted thereon.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF THE PREFERRED EMBODIMENT

Figure 2:
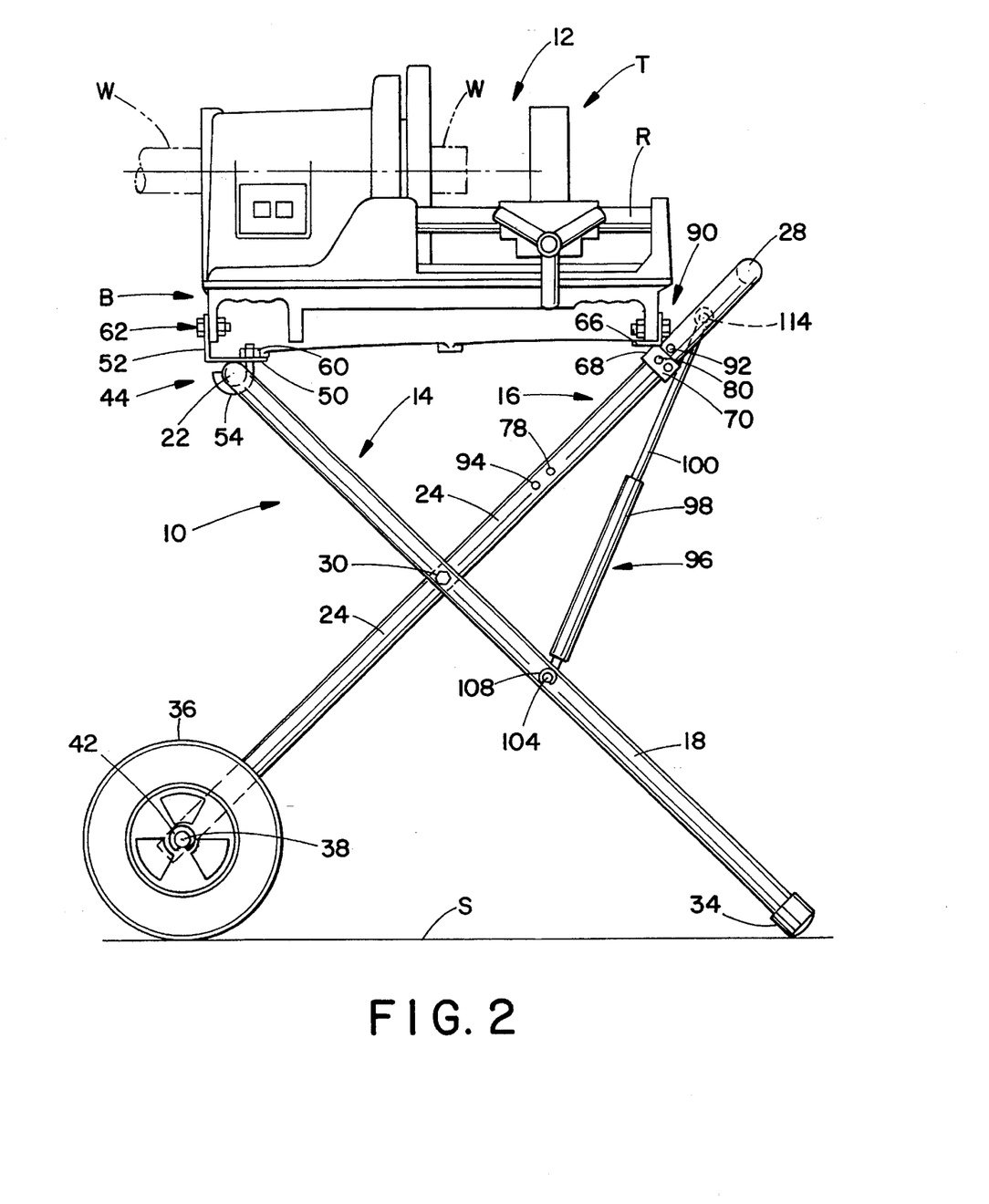
FIG. 2 is a side elevation view of the stand in its unfolded position and showing a power driven threading machine mounted thereon.

With reference now in greater detail to the drawings wherein the showings are for the purpose of illustrating a preferred embodiment of the invention only and not for the purpose of limiting the invention, there is illustrated a foldable stand 10 for a power driven threading machine 12. Stand 10 is comprised of a pair of support members 14 and 16 which are structured and interconnected as more fully described hereinafter for the stand and the machine thereon to be supported relative to an underlying surface S with the stand unfolded to facilitate supporting machine 12 in a use position relative to surface S, as shown in FIG. 2, and for the stand to be folded to the position shown in FIG. 3 in which the stand facilitates transportation of the machine. The structure and operation of threading machine 12 is not important to the present invention and, as is well known in the threading machine art, the threading machine includes a base B and is adapted to receive a workpiece W and to rotate the workpiece relative to tooling T which is axially displaceable along rails R relative to the adjacent end of workpiece W so as to enable the performing of work thereon, such as cutting, reaming and/or threading of the workpiece end. As is further well known in connection with such threading machines, workpiece W extends through a machine spindle which is driven by a suitable motor and transmission mechanism within the machine housing. In connection with the embodiment of the stand disclosed herein, the threading machine has a length of about 26 inches, a height of about 16 inches, a width of about 16 inches, and weighs about 125 pounds.

Figure 1:
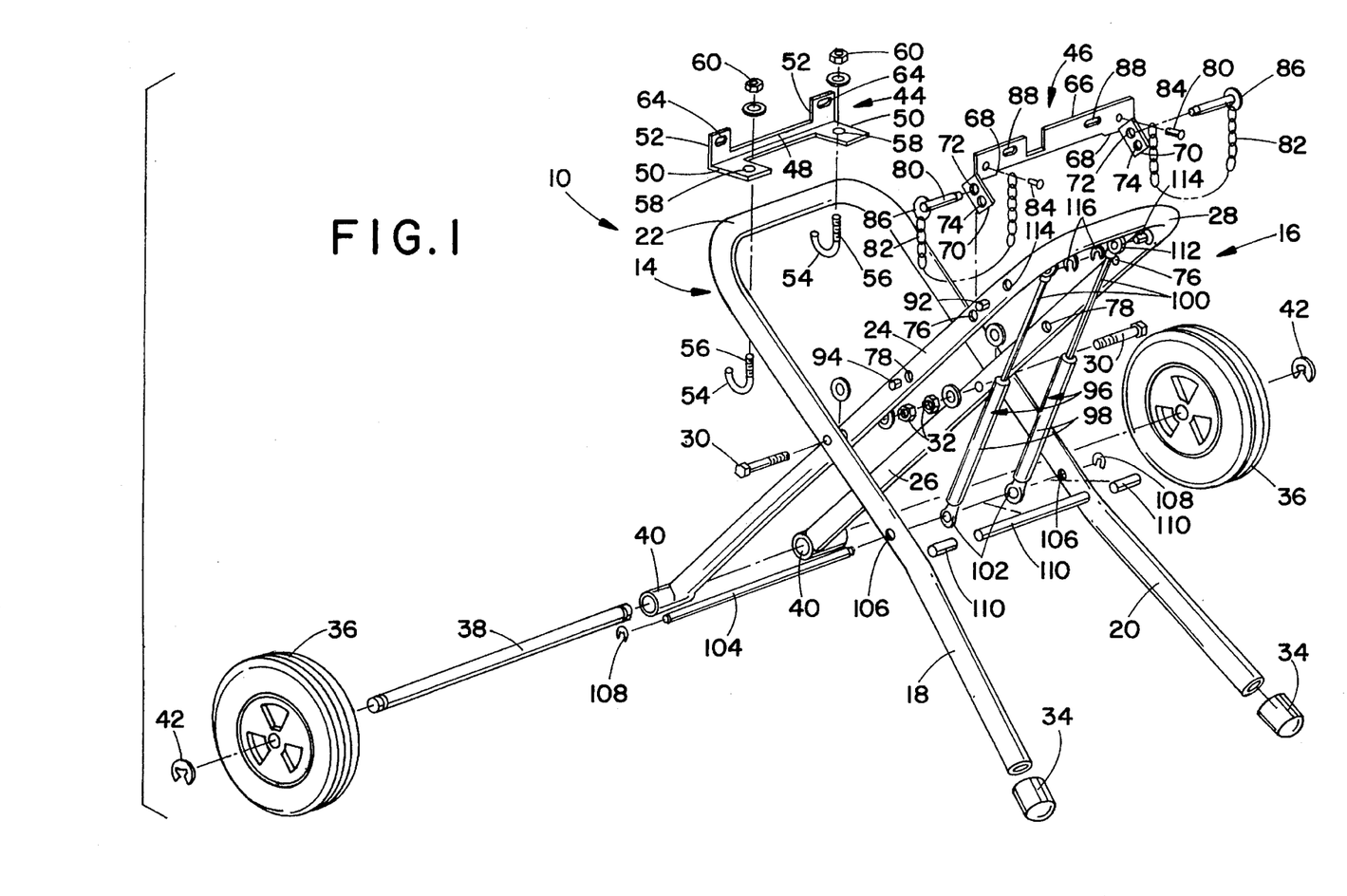
FIG. 1 is an exploded perspective view of a foldable stand in accordance with the present invention.

Support member 14 is comprised of metal tubing bent to a generally U-shaped configuration to provide parallel spaced apart legs 18 and 20 and an integral cross member 22 therebetween, and support member 16 is comprised of metal tubing bent to a generally U-shaped configuration to provide parallel spaced apart legs 24 and 26 and a cross member 28 therebetween. Legs 24 and 26 are inwardly adjacent legs 18 and 20, respectively, and support members 14 and 16 are pivotally interconnected intermediate the opposite ends thereof by bolt and nut assemblies including bolts 30 which extend through openings therefor in the corresponding pair of legs 18, 24 and 20, 26, which openings are not designated numerically, and nuts 32 received on the inner ends of the bolts. Washers, not designated numerically, are preferably interposed between the adjacent legs and between nuts 32 and the inner sides of the corresponding one of the legs 24 and 26.

The lowermost ends of legs 18 and 20 of support member 14 are provided with end caps 34 of rubber, plastic or other suitable material, and the lowermost ends of legs 24 and 26 are provided with wheels 36 by which the stand and machine are supported and moveable along an underlying surface as described more fully hereinafter. Wheels 36 are mounted on the lowermost ends of legs 24 and 26 by an axle rod 38 received in sleeves 40 suitably secured to the lower ends of the legs, such as by welding. The axially opposite ends of rod 38 extend through openings therefor in the corresponding one of the wheels 36 and receive retainer clips 42 by which the wheels and axle rod are maintained in assembled relationship relative to support member 16. As will be appreciated from FIGS. 2 and 3, wheels 36 and end caps 34 of the stand engage underlying support surface S when the stand is both in its folded and unfolded positions.

Threading machine 12 is mounted on stand 10 by means of a bracket 44 mounted on cross member 22 of support member 14 and a bracket 46 selectively mountable in first and second positions spaced apart along the upper end of support member 16 and which positions respectively correspond to the unfolded and folded positions of stand 10. More particularly with regard to the mounting brackets, both of which are constructed of metal, bracket 44 comprises a body portion 48, which extends along cross member 22, and L-shaped bracket portions at the opposite ends of the body portion and each of which includes a horizontal plate 50 and a vertical plate 52. Bracket 44 is pivotally mounted on cross member 22 by means of a pair of J-bolts 54 which underlie cross member 22 and have threaded upper ends 56 extending through openings 58 therefor in the corresponding one of the bracket plates 50. The upper ends 56 receive nuts 60 and interposed washers, not designated numerically, by which the bracket is pivotally secured in place on cross member 22. As will be appreciated from FIGS. 2 and 3, bracket plates 52 of bracket 44 overlie the corresponding end of base B of threading machine 12 and are secured thereto by nut and bolt assemblies 62 which extend through openings 64 in bracket plates 52 and through openings in base B so as to secure the corresponding end of threading machine 12 to the mounting bracket.

Mounting bracket 46 comprises a vertical bracket plate portion 66 which extends between legs 24 and 26 of support member 16, and bracket plates 68 at the opposite ends of plate portion 66 which extend downwardly therefrom at an angle which provides for plates 68 to be parallel to legs 24 and 26 when the stand is in the unfolded position shown in FIG. 2. Bracket 46 further includes a pair of mounting flanges 70 each extending downwardly from a corresponding one of the bracket plates 68 so as to overlie the outer side of the corresponding one of the legs 24 and 26. Each mounting flange 70 is provided with upper and lower openings 72 and 74, respectively, for the purpose set forth hereinafter. Legs 24 and 26 are each provided with a first opening 76 near cross member 28 and a second opening 78 spaced from the first opening in the direction towards the pivotal connection between support members 14 and 16. Bracket 46 is adapted to be selectively mounted on support member 16 in either one of a first and second position respectively corresponding to openings 76 and 78 by means of mounting pins 80 which, preferably, are retained on bracket 46 by corresponding chains 82 having one end fastened to plate portion 66 of the bracket by a screw 84 and the other end fastened to pin 80 by means of a ring 86, as shown in FIG. 1. Bracket plate portion 66 is provided with openings 88 and, as will be appreciated from FIGS. 2 and 3, bracket 46 is adapted to be fastened to the front end of base B of the threading machine by nut and bolt assemblies 90 which extend through bracket openings 88 and corresponding openings in the machine base. For the reasons set forth hereinafter, legs 24 and 26 of support member 16 are provided with an upper pair of stop lugs 92 and a lower pair of stop lugs 94, only one lug of each pair being visible in the drawings. As will be appreciated from FIG. 1, each stop lug 92 is spaced above the corresponding pin opening 76 and projects axially outwardly from the outer side of the corresponding one of the legs 24 and 26. As will likewise be appreciated from FIG. 1, each of the stop lugs 94 is spaced below the corresponding pin opening 78 and projects axially outwardly from the outer side of the corresponding one of the legs 24 and 26.

Counterbalance for the weight of threading machine 12 during displacement of stand 10 between the folded and unfolded positions thereof is provided by a pair of air spring units 96 comprising cylinder components 98 pivotally connected between legs 18 and 20 of support member 14 and piston rods 100 pivotally connected to legs 24 and 26 of support member 16. More particularly in this respect, the lower ends of cylinder components 98 are provided with apertured mounting lugs 102 which receive a support rod 104 which extends between legs 18 and 20 and through openings 106 provided therefor in the legs. The axially opposite ends of rod 104 are grooved to receive retaining clips 108 by which the rod is retained in place between legs 18 and 20, and spacer sleeves 110 are received on rod 104 to space mounting lugs 102 from one another and from the corresponding one of the legs 18 and 20. The upper ends of piston rods 100 are provided with mounting lugs 112 which are apertured to receive mounting studs 114, extending inwardly from the inner sides of legs 24 and 26 of support member 16. The axially inner ends of studs 114 are grooved to receive retaining clips 116 by which the corresponding mounting lug 112 is axially retained on the stud. As is well known, and therefore not illustrated in detail, the lower end of piston rod 100 extends into cylinder 98 and is attached to a piston which is reciprocable within the cylinder. As is further well known, such gas springs are self-contained units charged with a suitable gas under pressure, such as nitrogen, and which gas is operable on opposite sides of the piston through a valving arrangement to control relative displacement between the piston and cylinder in response to a load which extends or retracts the piston rod relative to the cylinder. The gas pressure in the cylinder is selected to give a desired control based on the weight of the load, and in connection with the preferred embodiment herein illustrated and described, the gas springs are operable to control the unfolding of the stand with the threading machine mounted thereon from the position shown in FIG. 3 to the unfolded position shown in FIG. 2 with a lift force of about 50 to 60 pounds.

When the folding stand and threading machine are in the unfolded position of the stand shown in FIG. 2, retaining pins 80 extend through apertures 72 in mounting flanges 70 and through openings 76 in legs 24 and 26 of support member 16 to support threading machine 12 in an elevated use position relative to underlying surface S. To lower the stand and machine to the folded position of the stand shown in FIG. 3, retaining pins 80 are withdrawn from the legs and bracket flange openings and a downward force is applied to cross member 28 of support member 16 whereupon the upper ends of support members 14 and 16 pivot in opposite directions about bolts 30 and in diverging relationship to one another. During such relative displacement between support members 14 and 16, plate portions 68 of second bracket 46 slide downwardly along the upper sides of legs 24 and 26 of support member 16 and the weight of the threading machine is counterbalanced by gas springs 96. When the component parts reach the positions shown in FIG. 3, mounting flanges 70 engage stop lugs 94 to limit relative displacement between support members 14 and 16 in the direction of folding. Furthermore, as bracket plates 68 slide downwardly along the upper sides of legs 24 and 26 of support member 16, their orientation relative to legs 24 and 26 changes from the coplanar relationship shown in FIG. 2 to the position shown in FIG. 3 in which the bracket plates are inclined relative to the upper sides of the legs. Thus, when the bracket plates engage stop lugs 94, lower openings 74 in the mounting flanges are aligned with openings 78 in legs 24 and 26, and retaining pins 80 are introduced through flange openings 74 and openings 78 in the legs to interconnect bracket 46 in its second position relative to the legs of support member 16.

In the folded position of the stand, the stand and machine can be pivoted upwardly about the axis of wheels 36 to facilitate transporting the stand and machine along surface S. In this respect, a workman can grasp the lowermost ends of legs 18 and 20 of support member 14 and elevate the latter so as to move the stand and machine in the manner of a wheelbarrow. Alternatively, the workman can grasp cross member 28 of support member 16 and elevate and push the stand and machine in the manner of a pushcart. Since cross member 28 is elevated somewhat above the lower most ends of legs 18 and 20 when the stand is folded, the foregoing alternatives for transporting the stand and machine can be selected according to what is most comfortable for a given workman.

Figure 3:
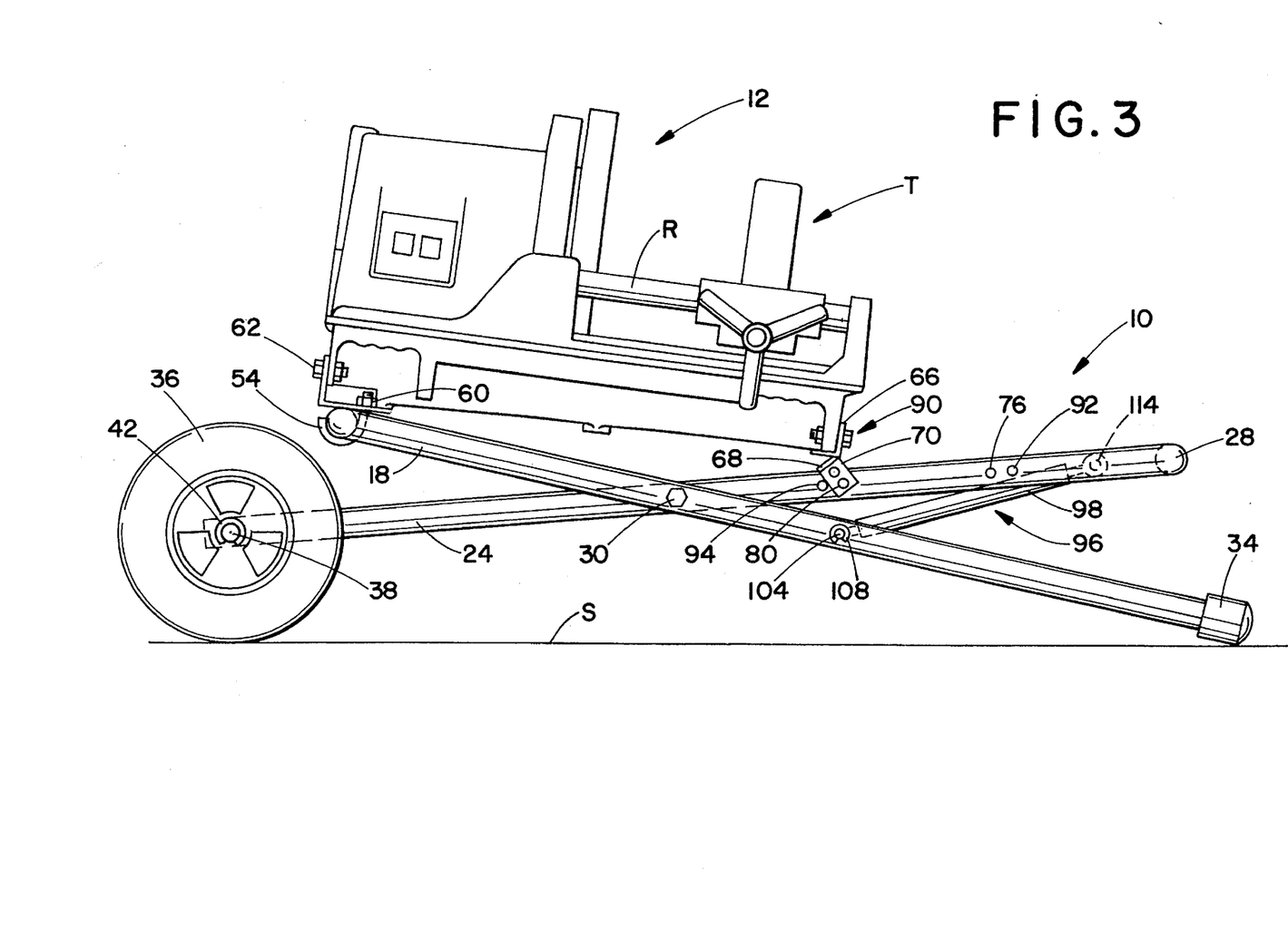
FIG. 3 is a side elevation view of the stand and threading machine in the folded position of the stand.

In order to displace the stand from the folded position shown in FIG. 3 to the unfolded position shown in FIG. 2, retaining pins 80 are withdrawn from mounting flange openings 74 and openings 78 in legs 24 and 26, and an upward force is applied to cross member 28 of support member 16, whereupon support members 14 and 16 pivot in opposite directions about bolts 30 such that the upper ends of the support members move in a converging direction relative to one another. During such relative displacement between support members 14 and 16, bracket plates 68 on second bracket 46 slide upwardly along the upper sides of legs 24 and 26 of support member 16, and it will be appreciated that such displacement of bracket 46 against the weight of threading machine 12 is the result of a combination of the lifting force provided by air springs 96 and the manual lifting force of 50 to 60 pounds applied by the workman to cross member 28. When the component parts reach the positions shown in FIG. 2, mounting flanges 70 engage stop lugs 92, thus to limit relative displacement between support members 14 and 16 in the unfolding direction and to align mounting flange openings 72 with openings 76 in legs 24 and 26 of support member 16. When so positioned, retaining pins 80 are introduced through the mounting flange and leg openings to interconnect bracket 46 in its first position relative to support member 16 and in which threading machine 12 is supported in a use position relative to underlying surface S.

While considerable emphasis has been placed herein on the preferred embodiment, it will be appreciated that other embodiments of the invention can be devised and that many changes can be made in the preferred embodiment without departing from the principles of the invention. In this respect, for example, other arrangements can be provided for pivotally supporting one end of the threading machine on the stand and providing for the other end of the threading machine to be selectively interengaged with the stand in positions corresponding to the unfolded and folded positions of the stand. Further, while it is preferred that the stand be wheeled to facilitate movement thereof from one location to another, it will be appreciated, in the embodiment illustrated, that the wheels could be eliminated and replaced by curved lower ends of the corresponding legs of the stand which would facilitate sliding movement of the folded stand along an underlying surface, or carrying of the stand by two workmen using the legs at the opposite ends as handles for this purpose. Still further, it will be appreciated that one or more than two gas springs can be used to achieve the desired counterbalance in conjunction with folding and unfolding the stand and a machine thereon, and that the gas spring or springs can be interconnected between the support members of the stand other than in the preferred positions illustrated herein. These and other changes in the preferred embodiment as well as other embodiments of the invention will be obvious to those skilled in the art from the present disclosure whereby it is to be distinctly understood that the foregoing descriptive matter is to be interpreted merely as illustrative of the invention and not as a limitation.

Having thus described the invention, it is claimed:

1. A folding stand for supporting a power driven threading machine relative to an underlying surface comprising, first and second support means having corresponding upper and lower ends, means interconnecting said first and second support means between said upper and lower ends thereof for relative pivotal displacement between unfolded and folded positions in which said upper ends of said first and second support means are respectively elevated and lowered relative to said underlying surface, means for supporting said machine between said upper ends of said first and second leg means in said unfolded and folded positions, and self contained fluid operated counterbalance means between said Upper end of one of said first and second support means and said lower end of the other of said first and second support means for counterbalancing the weight of said machine during relative displacement of said first and second support means between said unfolded and folded positions.

2. A folding stand according to claim 1, wherein said counterbalance means includes gas spring means.

3. A folding stand according to claim 1, wherein said lower end of one of said first and second support means includes wheel means.

4. A folding stand according to claim 3, wherein said counterbalance means includes gas spring means.

5. A folding stand according to claim 1, wherein said means for supporting said machine includes first bracket means pivotally mounted on said upper end of one of said first and second support means, and second bracket means releasably interconnected with said upper end of the other of said first and second support means.

6. A folding stand according to claim 5, and means for releasably interconnecting said second bracket means in first and second bracket positions on said upper end of said other of said first and second support means, said first and second bracket positions corresponding respectively to said unfolded and folded positions of said support means.

7. A folding stand according to claim 6, and means on said other support means engaging with said second bracket means to limit relative pivotal displacement of said first and second support means between said unfolded and folded positions.

8. A folding stand according to claim 5, wherein said lower end of one of said first and second support means includes wheel means.

9. A folding stand according to claim 8, wherein said counterbalance means includes gas spring means.

10. A folding stand according to claim 9, and means for releasably interconnecting said second bracket means in first and second bracket positions on said upper end of said other of said first and second support means, said first and second bracket positions corresponding respectively to said unfolded and folded positions of said support means.

11. A folding stand according to claim 10, and means on said other support means engaging with said second bracket means to limit relative pivotal displacement of said first and second support means between said unfolded and folded positions.

12. A folding stand for supporting a power driven threading machine relative to an underlying surface comprising, first and second support members each including a pair of parallel spaced apart legs having upper and lower ends, wheel means on said lower ends of said legs of said second support member, means pivotally interconnecting said legs of said first and second support members for relative pivotal displacement of said support members between unfolded and folded positions, said wheel means and said lower ends of said legs of said first support member engaging said underlying surface in each said position of said support members, said upper ends of said legs of said first and second support members being elevated and lowered relative to said underlying surface respectively in said unfolded and folded positions of said support members, first and second mounting bracket means for mounting said machine between said upper ends of said legs of said first and second support members, said first mounting bracket means being between said upper ends of said legs of said first support member, said second mounting bracket means being between said legs of said second support member, means for selectively mounting said second bracket means on said legs of said second support member at a first position adjacent said upper ends of said legs of said second support member and at a second position spaced from said first position toward said means pivotally interconnecting said legs, said first and second positions of said second bracket means corresponding respectively to said unfolded and folded positions of said support members, and counterbalance means between said first and second support members for counterbalancing the weight of said machine during relative displacement of said support members between said unfolded and folded positions.

13. A folding stand according to claim 12, wherein said counterbalance means is fluid operated.

14. A folding stand according to claim 12, wherein said counterbalance means includes gas spring means.

15. A folding stand according to claim 12, wherein said counterbalance means includes a pair of self contained fluid operated piston and cylinder units each connected between said lower ends of said legs of one of said first and second support members and said upper ends of said of legs of the other of said first and second support members.

16. A folding stand according to claim 15, wherein each of said units is a gas spring.

17. A folding stand according to claim 12, wherein said first support member includes cross member means between said upper ends of said legs thereof and said first mounting bracket means is pivotally supported on said first cross member means.

18. A folding stand according to claim 12, and means on said legs of said second support member respectively interengageable with said second bracket means in said first and second positions thereof to limit pivotal displacement of said first and second support members between said unfolded and folded positions.

19. A folding stand according to claim 12, wherein said counterbalance means includes a pair of gas springs each connected between the upper ends of said legs of one of said first and second support members and the lower ends of said legs of the other said first and second support members.

20. A folding stand for supporting a power driven threading machine relative to an underlying surface comprising, first and second support members each including a pair of parallel spaced apart legs having upper and lower ends, wheel means on said lower ends of said legs of said second support member, means pivotally interconnecting said legs of said first and second support members for relative pivotal displacement of said support members between unfolded and folded positions, said wheel means and said lower ends of said legs of said first support member engaging said underlying surface in each said position of said support members, said upper ends of said legs of said first and second support members being elevated and lowered relative to said underlying surface respectively in said unfolded and folded positions of said support members, first and second mounting bracket means for mounting said machine between said upper ends of said legs of said first and second support members, said first mounting bracket means being between said upper ends of said legs of said first support member, said second mounting bracket means being between said legs of said second support member, means for selectively interconnecting said second bracket means with said legs of said second support member at a first position adjacent said upper ends of said legs of said second support member and at a second position spaced from said first position toward said means pivotally interconnecting said legs, said first and second positions of said second bracket means corresponding respectively to said unfolded and folded positions of said support members, and counterbalance means between said first and second support members for counterbalancing the weight of said machine during relative displacement of said support members between said unfolded and folded positions, said means for selectively interconnecting said second bracket means with said legs of said second support member including openings through said legs at said first and second positions, said second bracket means including apertures therethrough alignable with said openings, and pin means removably received in said apertures and openings.

21. A folding stand for supporting a power driven threading machine relative to an underlying surface comprising, first and second support members each including a pair of parallel spaced apart legs having upper and lower ends, wheel means on said lower ends of said legs of said second support member, means pivotally interconnecting said legs of said first and second support members for relative pivotal displacement of said support members between unfolded and folded positions, said wheel means and said lower ends of said legs of said first support member engaging said underlying surface in each said position of said support members, said upper ends of said legs of said first and second support members being elevated and lowered relative to said underlying surface respectively in said unfolded and folded positions of said support members, first and second mounting bracket means for mounting said machine between said upper ends of said legs of said first and second support members, said first mounting bracket means being between said upper ends of said legs of said first support member said second mounting bracket means being between said legs of said second support member, means for selectively interconnecting said second bracket means with said legs of said second support member at a first position adjacent said upper ends of said legs of said second support member and at a second position spaced from said first position toward said means pivotally interconnecting said legs, said first and second positions of said second bracket means corresponding respectively to said unfolded and folded positions of said support members, and counterbalance means between said first and second support members for counterbalancing the weight of said machine during relative displacement of said support members between said unfolded and folded positions a said counterbalance means including a pair of gas springs each connected between the upper ends of said legs of one of said first and second support members and the lower ends of said legs of the other said first and second support members, said first support member including first cross member means between said upper ends of said legs thereof and said first mounting bracket means being pivotally supported on said first cross member means, said means for selectively interconnecting said second bracket means with said legs of said second support member including openings through said legs at said first and second positions, said second bracket means including apertures therethrough alignable with said openings, and pin means removably received in said apertures and openings.

22. A folding stand according to claim 21, and means on said legs of said second support member respectively interengageable with said second bracket means in said first and second positions thereof to limit pivotal displacement of said first and second support members between said unfolded and folded positions.

23. A foldable stand according to claim 22, wherein said second support member includes second cross member means between said upper ends of said legs thereof, each of said gas springs having upper and lower ends, means pivotally connecting said upper ends of said gas springs to said upper ends of said legs of said second support member adjacent said second cross member means, and means connecting said lower ends of said gas springs to said lower ends of said legs of said first support member.

24. A folding stand for supporting a power driven threading machine relative to an underlying surface comprising, first and second support means having corresponding upper and lower ends, means interconnecting said first and second support means between said upper and lower ends thereof for relative pivotal displacement between unfolded and folded positions in which said upper ends of said first and second support means are respectively elevated and lowered relative to said underlying surface, said threading machine having opposite ends, first means for pivotally supporting one end of said machine on said upper end of one of said first and second support means, second means for supporting the other of said ends of said machine in a first position adjacent said upper end of the other of said first and second support means and in a second position between said first position and said means interconnecting said first and second support means, said first and second positions corresponding respectively to said unfolded and folded positions, and means for releasably mounting said second means on said upper end of said other support means in each of said first and second positions.

25. A folding stand according to claim 24, wherein said first and second means supporting said machine respectively include first and second bracket means.

26. A folding stand according to claim 25, and means on said other support means engaging with said second bracket means to limit relative pivotal displacement of said first and second support means between said unfolded and folded positions.

27. A folding stand according to claim 25, wherein said means for releasably mounting said second means on said upper end of said other support means includes pin means releasably interconnecting said second bracket means and said upper end of said other support means.

28. A folding stand according to claim 27, and means on said other support means engaging with said second bracket means to limit relative pivotal displacement of said first and second support means between said unfolded and folded positions.

29. A folding stand according to claim 28, wherein said lower end of one of said first and second support means includes wheel means.

30. A folding stand according to claim 24, and counterbalance means between said upper end of said other support means and said lower end of said one support means.

31. A folding stand according to claim 30, wherein said counterbalance means includes self contained fluid operated piston and cylinder means.

* * * * *

UNITED STATES PATENT AND TRADEMARK OFFICE
CERTIFICATE OF CORRECTION

PATENT NO.    :    5,560,582
DATED         :    October 1, 1996
INVENTOR(S)   :    Valere H.J. Beelen It is certified that error appears in the above-identified patent and that said Letters Patent is hereby corrected as shown below:

On the title page, item [75] Inventor: change "St. Trond" to --Sint-Truiden--.

Column 9, line 38, delete "first".

Column 10, line 42, after "member", insert --,--.

Column 10, line 55, delete "a" and insert therefor --,--.

Signed and Sealed this

Fifteenth Day of July, 1997

Attest:

BRUCE LEHMAN

*Attesting Officer*    *Commissioner of Patents and Trademarks*